United States Patent [19]

Millauer et al.

[11] Patent Number: 4,885,511
[45] Date of Patent: Dec. 5, 1989

[54] DRIVE CONTROL WITH OVERLOAD PROTECTION FOR A DRILL DEVICE

[75] Inventors: Wolfgang Millauer, Munich, Fed. Rep. of Germany; Gottfried Benz, Schaan, Switzerland; Heinrich Pauli, Germering; Franz Hoyss, Wackersberg, both of Fed. Rep. of Germany

[73] Assignee: Hilti Aktiengesellschaft, Fed. Rep. of Germany

[21] Appl. No.: 237,699

[22] Filed: Aug. 26, 1988

Related U.S. Application Data

[63] Continuation-in-part of Ser. No. 37,179, Apr. 10, 1987, abandoned.

[30] Foreign Application Priority Data

Apr. 11, 1986 [DE] Fed. Rep. of Germany ....... 3612193

[51] Int. Cl.$^4$ ............................................. H02P 7/62
[52] U.S. Cl. .................................. 318/434; 318/433; 388/819
[58] Field of Search ............... 318/310, 312, 315, 317, 318/345 D, 345 H, 432, 434, 433; 388/819

[56] References Cited

U.S. PATENT DOCUMENTS

| 3,903,465 | 9/1975 | Ibamoto et al. | 388/819 |
|---|---|---|---|
| 4,119,897 | 10/1978 | Skoog | 318/317 X |
| 4,233,549 | 11/1980 | Dighe | 388/819 |
| 4,413,212 | 11/1983 | Okamoto et al. | 318/317 |
| 4,458,186 | 7/1984 | Kuriyama et al. | 388/819 |
| 4,481,448 | 11/1984 | Bishop | 318/345 D X |
| 4,490,657 | 12/1984 | Smith | 318/434 |
| 4,517,506 | 5/1985 | Heinrich et al. | 318/432 X |
| 4,574,226 | 3/1986 | Binder | 318/434 X |
| 4,605,883 | 8/1986 | Cockroft | 318/345 D X |
| 4,605,885 | 8/1986 | Mitsuhashi | 318/317 |
| 4,659,976 | 4/1987 | Johanson | 318/434 X |

FOREIGN PATENT DOCUMENTS 54-161016 12/1979 Japan ................................. 388/819

Primary Examiner—Bentsu Ro
Attorney, Agent, or Firm—Toren, McGeady & Associates

[57] ABSTRACT

Drive control for a drilling device including a universal motor is arranged so that the total available mains voltage is applied when a fraction of the motor torque, available for the full work range of the device, is reached. If a higher torque is desired, the motor torque/rotational speed curve follows the natural characteristic line until a load point is reached where current limitation occurs. Accordingly, as the motor speed decreases as the normal work range is exceeded, the operator of the drilling device is signaled concerning the load state due to the noise developed in the drilling device.

2 Claims, 2 Drawing Sheets

DRIVE CONTROL WITH OVERLOAD PROTECTION FOR A DRILL DEVICE

This is a continuation-in-part of application Ser. No. 037,179, filed Apr. 10, 1987, now abandoned.

BACKGROUND OF THE INVENTION

The present invention is directed to a drive control for a drilling device, particularly drilling devices for operating diamond-tipped drills.

In such a drilling device, the drive motor is usually a series wound universal motor.

The characteristic line (speed over torque) of such a drive motor has a curve with the speed decreasing in a monotonic manner, that is, linearly to a great extent, as the torque increases. The curve of this characteristic line is shown in the drawing.

In a known drive motor of this type, stoppage is reached at approximately four to six times the nominal moment. Accordingly, the motor develops relatively high forces before stoppage and receives a correspondingly high current. When these conditions exist, it can lead to serious damage of the drilling device and the drilling tool.

In addition, the idling point of this drive motor runs at such a high speed, which decreases relatively rapidly during loading, that as a practical matter it cannot be used effectively. Moreover, the high idling speed results in considerable stress on individual components, such as the gear unit bearing and shaft seals, and determines the effective lifetime of the drilling device. Furthermore, under certain circumstances, the high idling speed substantially influences the maximum noise level of the device during operation.

It is also known to provide a speed control connected with a current limitation for such a drilling device. The speed control prevents an unwanted increase in speed in the range of the partial load so that the device can be operated at the same speed. The current limitation limits maximum current absorption and the maximum torque whereby, when a determined current is exceeded, it reduces the voltage available at the motor so that there can be no further increase in current. As a result, the speed decreased very rapidly, possibly to a point of stoppage, when the moment requirement at the drill spindle is unchanged or increases. Since the current flowing under such conditions can be dangerous for the motor, because of the absence of cooling air at the stoppage point, a characteristic line which results in an additional reduction in current as the speed decreases is often selected for current limitation. Such a characteristic is also known as a "foldback characteristic line" in technial circles.

For the operator of a drilling device using diamond-tipped drilling tools, operated as a rule in the same manner as an upright drilling machine with hand actuated mechanical forward feed, the result of current limitation of the latter type, is that when the maximum contact pressure force is exceeded, which is equivalent to exceeding the maximum current, the drill spindle speed decreases very rapidly towards zero so that there is hardly time to react, that is to disengage or release the forward feed before the drill spindle stops. It is possible that the drilling tool or bit may become fixed so that the forward feed must be reversed considerably to place the drive in forward motion again. Such operational problems would be considered disadvantageous by a user of the drilling device.

The problem connected with the stoppage of the motor has special significance in that a virtually load independent speed is achieved over the entire work range with a speed-controlled drive. As a result, the operator loses the "feel" for the adjusted load state, because the entire speed dependent noise frequency spectrum takes on a "constant character" and the usual accustomed decrease in speed, which acts as a "load indicator" is no longer noticeable as a noise frequency decrease.

SUMMARY OF THE INVENTION

Therefore, the primary object of the present invention is to provide a controlled drive more suitable for drilling devices, particularly for operation with diamond-tipped tools, so that the above-mentioned negative results of a current limitation during increasing work torque and motor stoppage no longer occur or present a substantially smaller risk.

Accordingly, the present invention is directed to the operation of a speed control as mentioned above with current limitation along with a universal motor of a special design.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
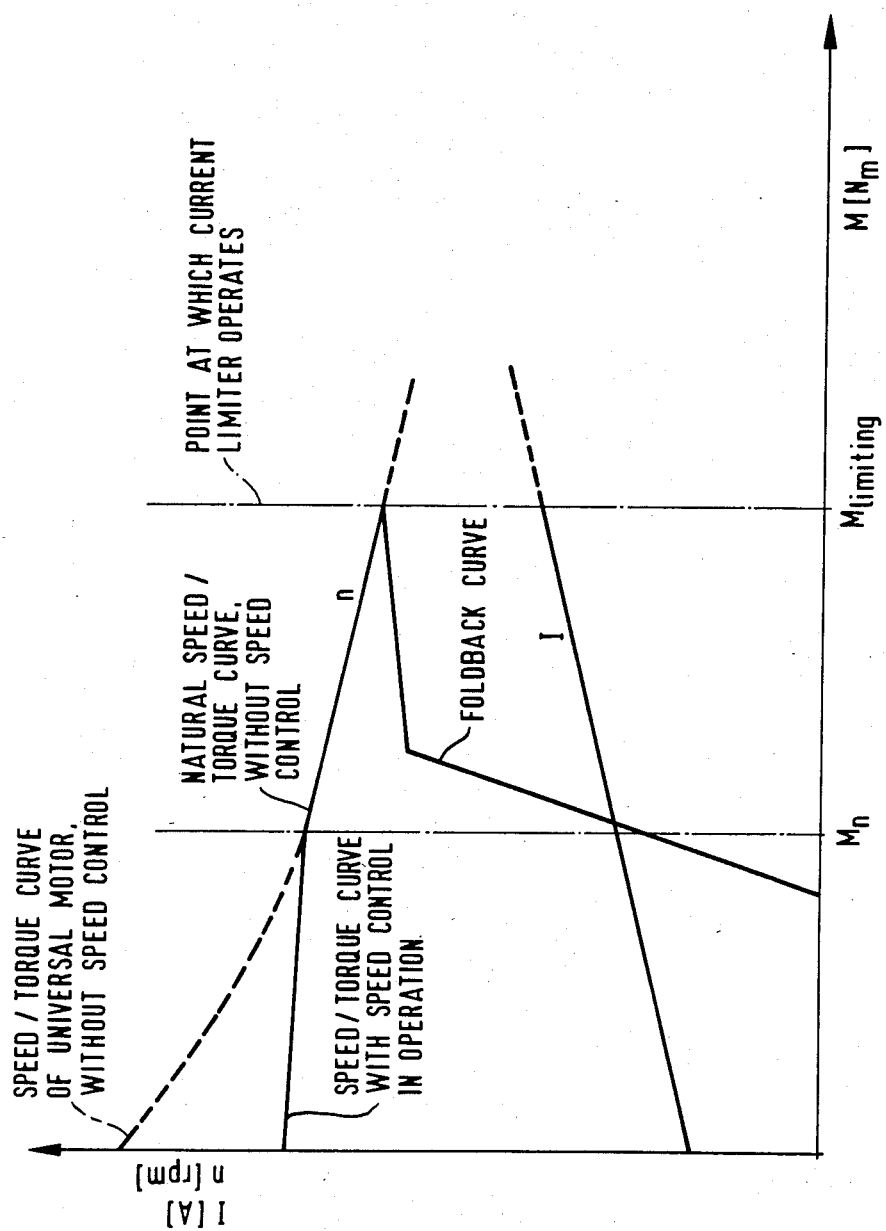
FIG. 1 is a graphic representation of the speed control of a drilling device embodying the present invention.

According to the invention, the motor and speed control are selected so that the motor requires the total available supply voltage (mains voltage) at a fraction of the torque available over the entire work range of the device. In the drawing, this point is arbitrarily designated by $M_n$. At this point on the characteristic line the speed control loses its effectiveness for the remainder of the characteristic line to the right of the point $M_n$, since the total available supply voltage, from which something may be subtracted but not added, due to the control, is already applied. Accordingly, the motor is operated along the natural characteristic line during increasing load after reaching the point $M_n$ and reacts to an increase in load with a relatively strong speed surge, as described.

As the drilling device operator approaches the response point, $M_{limit}$ of the current limitation with increasing load, he will be continuously informed or signaled in sufficient time about this operational state due to a corresponding decrease of the frequency of the entire noise spectrum. After repeatedly reaching the point of the current limitation, at the latest, an operator of average capability will develop a feeling for the magnitude of the load or for the location of the response point due to observation of the nose behavior of the drilling device before the response point of current limitation is reached.

Accordingly, the operation of the drilling device is easier for the operator due to the present invention. In addition, the quality of the speed control is maintained in full over the range in which it is primarily desired, that is for limiting the idling increase. The current limitation also remains completely effective in the range of overload. Between the range of the normal load and the response point, however, there is a characteristic line range where neither functions, and the device behaves like an uncontrolled electric tool which clearly signifies its load state due to its noise development. Moreover, the point of application of current limitation makes it possible for the operator to develop a feel for load state of the drilling device and for the reasonable load for the device without damaging the device or its drilling tool. The development of such a feel is achieved in a kind of self-teaching process.

The drive control of the motor, in accordance with the present invention, is particularly inexpensive, since the desired new qualities are achieved without additional technical expenditure beyond that for a known speed control with current limitation.

Figure 2:
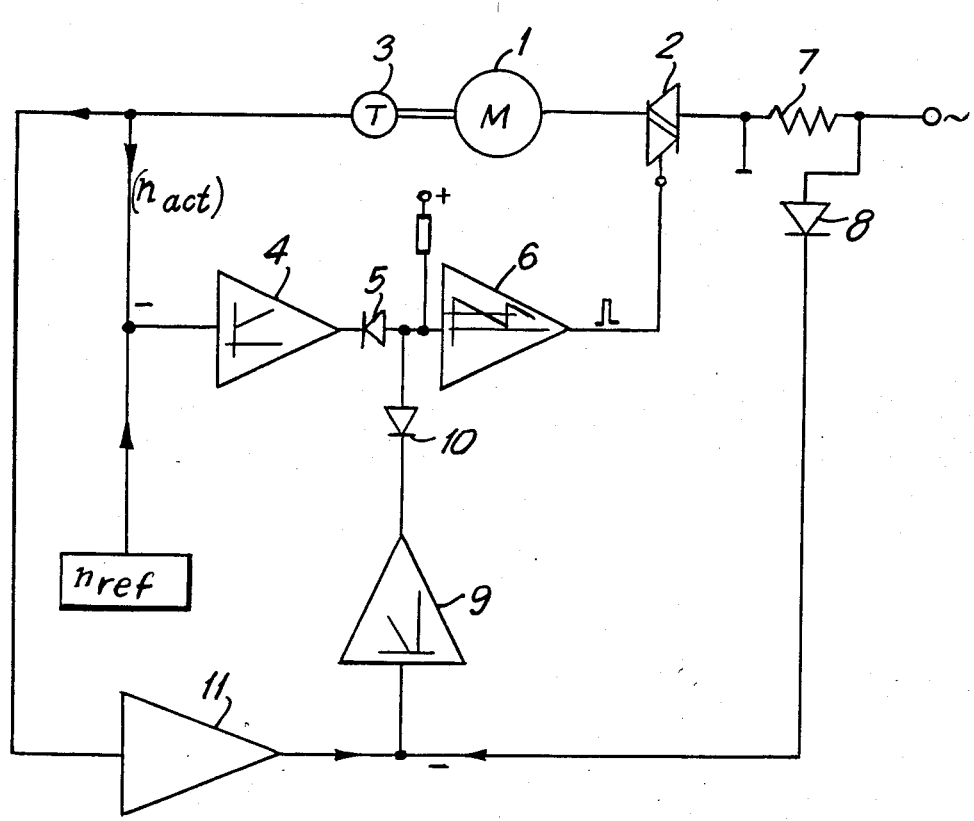
FIG. 2 is a schematic showing of the circuitry of the present invention connected to a universal motor.

In FIG. 2 there is shown the arrangement of the circuit for the drive control of the present invention. For simplicity, the circuit arrangement is displayed in a single pole manner. The circuit arrangement will be described in connection with the graphic representation of FIG. 1.

A universal motor 1 has an inlet connected to the available supply voltage (mains voltage). In the line connecting the motor 1 to the mains voltage, there is a triac 2 (bidirectional triode thyristor). In a line out of the motor 1 on the opposite side from the supply, the rpm of the motor is measured by a tachogenerator 3. In another line between the line containing the motor and the triac 2 there is an rpm regulator 4 in which the actual rpm value ($n_{act}$) is compared with a constant reference value ($n_{ref}$) from a source connected to the regulator 4. The output from the regulator 4 is connected with the input of a pulse control stage 6 located in the line leading to the triac 2. A decoupler diode 5 is located between the rpm regulator 4 and the pulse control stage 6. Therefore, through the rpm regulator 4, the decoupler diode 5 and the pulse control stage 6, the triac 2 is controlled so that the rpm acutal value always corresponds to the rpm reference value. In the supply line running to the motor 1, there is a sensor resistance 7 for measuring the current supplied to the motor 1. The value of the current measured by the sensor resistance 7 is rectified by the symbolically shown member 8 and compared with the current reference value provided by the output of the reference value generator 11 located in the line leading out of the motor 1. The difference between the measured current and the current reference value controls a current regulator 9 located in a line extending between the reference value generator 11 and the line containing the decoupler diode 5. The output of the current regulator 9 acts on the pulse control stage 6 through a decoupler diode 10 located in the line extending from the current regulator to the line between the decoupler diode 5 and the pulse control stage 6. The two decoupler diodes 5, 10 each takes care of the smaller modulation value of the rpm regulator 4 and the current regulator 9, respectively. Accordingly, these elements assume the regulation of the modulation which corresponds to the functional mode of a so-called two-channel limitation control ("Foldbackcharacteristic").

In accordance with the invention, by tuning the motor characteristic to the adjustment parameters of the rpm regulator 4 and the current regulator 9, the drive of the motor passes through three different segments, note FIG. 1. In segment 1 (below or to the left of $M_n$) the drive operates in a rpm controlled manner. The rpm regulator controls the drive.

In segment 2 (between $M_n$ and $M_{limiting}$) the drive operates along its natural characteristic curve, that is the natural speed/torque curve without speed control. The The rpm regulator 4 is overcontrolled, the triac 2 is completely modulated, the maximum possible voltage is applied to the motor 1, corresponding to the voltage of the mains. Neither of the regulators 4, 9 controls the drive.

When $M_{limiting}$ is reached or exceeded, that is, at $I = I_{limited}$, the equilibrium between $I_{ref}$ and $I_{act}$ at the current regulator is reached. Accordingly, current regulator 9 assumes the guidance and control of the drive in the reverse direction to prevent a further rise of the current. The drop in the rpm connected therewith causes a drop of the current reference value through the reference value generator 11 whereby another reduction of the modulation is caused to the extent that the load moment is not reduced below the available moment. Only if this situation exists can the rpm rise again, whereby the process can be reversed.

While specific embodiments of the invention have been shown and described in detail to illustrate the application of the inventive principles, it will be understood that the invention may be embodied otherwise without departing from such principles.

We claim:

1. A drive control for a drilling device with a series wound universal motor, comprising means for effecting current limitation to said motor when a load limit moment (M limit) is reached, wherein the improvement comprises:
    a circuit containing said motor (1), said circuit is connected to a supply voltage;
    an rpm regulator (4) located in the circuit for comparing an actual rpm value (N act) of said motor with a constant reference rpm value (N ref), said regulator (4) having an output voltage;
    means in said circuit and responsive to said regulator output voltage for maintaining the actual rpm value corresponding to the constant reference rpm value;
    said means for maintaining comprises a first decoupler diode (5) and a second decoupler diode (10), said first and second decoupler diodes (5, 10) having a junction point, wherein said rpm regulator (4) reaches maximum output voltage at a fraction point (Mn) of the load limit moment (M limit), and wherein the voltage at the junction point of said decoupler diodes remains constant during an increase in torque from the fraction point (Mn) to the load limit moment (M limit); and
    a current regulator (9) in said circuit for reducing the voltage at said junction point only when the load limit moment (M limit) is reached.

2. A drive control for drilling device with a series wound universal motor and current limitation when a load limit moment (M limit) is reached, wherein the improvement including that a motor torque/rotational speed characteristic line is selected for said drive control so that the total available supply torque is at a fraction (Mn) of the motor torque available for the total work range of the motor, comprises:
- a first line connected to said universal motor for supplying mains voltage therethrough; a triac located in said first line;
- a second line connected to said universal motor; a tachogenerator located in said second line for measuring an actual rpm of said motor;
- a third line connected between said first line and said second line, said third line is connected to said first line via said triac;
- an rpm regulator located in said third line;
- a constant reference value source connected to said rpm regulator for providing a reference rpm value;
- a pulse control stage in said third line having an input connected to an output of said rpm regulator via a first decoupler diode, and having an output connected to said triac for controlling the triac so that the actual rpm value of said motor corresponds to the reference rpm value; a sensor resistance in said first line for measuring the current flowing through said motor; a current reference value generator located in said second line and having an input and an output; a rectifier in said second line and connected to the output of said current reference value generator, said rectifier is arranged to rectify the current measured by said sensor resistance; and
- a fourth line connects said second line between said current reference value generator and said rectifier, and connects said third line between said first decoupler diode and said pulse control stage; a current regulator located in said fourth line; and a second decoupler diode located in said fourth line between said current regulator and said third line, whereby said first and said second decoupler diodes take care, respectively, of a smaller modulation value of said rpm regulator and said current regulator.

* * * * *

UNITED STATES PATENT AND TRADEMARK OFFICE
CERTIFICATE OF CORRECTION

PATENT NO. : 4,885,511

DATED : December 5, 1989

INVENTOR(S) : Wolfgang Millauer et al

It is certified that error appears in the above-identified patent and that said Letters Patent is hereby corrected as shown below:

On the title page:

[73] Assignee: Hilti Aktiengesellschaft, Fürstentum Liechtenstein

Signed and Sealed this

Sixth Day of November, 1990

Attest:

HARRY F. MANBECK, JR.

*Attesting Officer*  *Commissioner of Patents and Trademarks*